US012428128B2

(12) United States Patent
Bate (10) Patent No.: US 12,428,128 B2
(45) Date of Patent: Sep. 30, 2025

(54) WING ASSEMBLIES AND STRUCTURES FOR SUPPORTING WING TIP DEVICES

(71) Applicant: AIRBUS OPERATIONS LIMITED, Filton (GB)

(72) Inventor: Christopher Alan Bate, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 20 days.

(21) Appl. No.: 18/323,041

(22) Filed: May 24, 2023

(65) Prior Publication Data

US 2023/0382512 A1 Nov. 30, 2023

(30) Foreign Application Priority Data

May 25, 2022 (GB) .................................. 2207657

(51) Int. Cl.
*B64C 3/56* (2006.01)
(52) U.S. Cl.
CPC ...................................... *B64C 3/56* (2013.01)
(58) Field of Classification Search
CPC .. B64C 3/56; B64C 3/546; B64C 3/16; B64C 23/072; B64C 23/069
See application file for complete search history.

(56) References Cited

U.S. PATENT DOCUMENTS

| | | | |
|---|---|---|---|
| 1,985,649 A * | 12/1934 | Wallis | B64C 3/00 244/123.4 |
| 2,056,188 A | 10/1936 | Hayden | |
| 4,311,289 A * | 1/1982 | Finch | B64C 3/10 244/35 R |
| 6,089,502 A * | 7/2000 | Herrick | B64C 23/069 244/45 R |
| 8,544,800 B2 | 10/2013 | Stuhr | |
| 9,010,693 B1 | 4/2015 | Barbieri | |
| 9,499,255 B2 * | 11/2016 | Chaussee | B64C 3/56 |
| 9,889,920 B2 * | 2/2018 | Harding | B64C 3/56 |
| 9,914,523 B2 * | 3/2018 | Good | B64C 3/56 |
| 11,685,519 B2 * | 6/2023 | Sola | B64C 23/072 244/199.4 |
| 11,884,382 B2 * | 1/2024 | Wood | B64C 23/069 |
| 12,030,612 B2 * | 7/2024 | Johnson | B64C 3/546 |

(Continued)

FOREIGN PATENT DOCUMENTS

| | | |
|---|---|---|
| EP | 3 059 159 A1 | 8/2016 |
| GB | 2535580 A | 8/2016 |
| GB | 2544810 A | 5/2017 |

OTHER PUBLICATIONS

Extended European Search Report for Application No. EP 23175057. 1, nine pages, dated Sep. 22, 2023.

(Continued)

*Primary Examiner* — Richard Green
(74) *Attorney, Agent, or Firm* — Nixon & Vanderhye P.C.

(57) ABSTRACT

A wing structure is disclosed having a first span portion including a depth that reduces in a spanwise outward direction, and a second span portion outboard of the first span portion and having a substantially uniform spanwise depth D3. The second span portion may be non-tapered, and may include parallel fore and aft spar portions. In some embodiments the non-tapered portion supports a movable wing tip device. A wing assembly and an aircraft are also disclosed.

18 Claims, 5 Drawing Sheets

(56) References Cited

U.S. PATENT DOCUMENTS

2014/0306067 A1   10/2014  Guida
2017/0152016 A1    6/2017  Napier et al.
2020/0269971 A1    8/2020  Xi et al.

OTHER PUBLICATIONS

Combined Search and Examination Report for Application No. GB2207657.4, dated Nov. 28, 2022, 8 pages.

\* cited by examiner

WING ASSEMBLIES AND STRUCTURES FOR SUPPORTING WING TIP DEVICES

CROSS RELATED APPLICATION

This application claims priority to United Kingdom Patent Application GB 2207657.4, filed May 25, 2022, the entire contents of which is hereby incorporated by reference.

BACKGROUND OF THE INVENTION

The present invention relates to wing structures for supporting wing tip devices. More particularly, but not exclusively, the invention relates to wing structures for supporting movable wing tip devices. The invention also concerns wing assemblies comprising such wing structures, and aircraft comprising such assemblies.

The maximum aircraft wing span for passenger aircraft often is effectively limited by airport operating rules which govern various clearances required when maneuvering around the airport (such as the span and/or ground clearance required for gate entry and safe taxiway usage).

In some suggested designs, aircraft are provided with wing tip devices which may be moved to reduce the span of the aircraft on the ground (compared to when the aircraft is configured for flight). As wing spans continue to increase, the spanwise extent of wing tip devices relative to the inboard wing grows proportionally greater. Amongst the issues to be addressed is the problem of providing, without unduly impacting wing efficiency, a wing structure for accommodating an arrangement for transmitting, between a wing structure and a wing tip device, forces resulting from flight loads during flight and/or from ground loads during inboard and outboard movement of the wing tip device, and reliably and safely distributing such force within the wing structure.

SUMMARY OF THE INVENTION

The inventor has identified that, with the tendency for wing aspect ratios to increase and wing box thicknesses to decrease, further constraints to wing design are emerging regarding, for example, how and where to efficiently provide in the space available i) joints for reacting increasingly large flight loads transmitted between the movable wing tip device and the inboard wing of a wing assembly and/or ii) actuating mechanisms for driving the folding and unfolding of increasingly large and/or heavy wing tip device components. In designs for tapered wings, for example, as wing span increases the desired location along the wing for joining the wing tip device to the wing may be in a region of reduced cross sectional area and limited in space in which to accommodate and structurally support mechanisms for moving and/or securing in place a wing tip device and for distributing flight loads and other loads associated with such a device without unduly adversely affecting aerodynamic efficiency of the wing. Aspects of the present invention seek to mitigate or overcome at least some of the above-mentioned problems.

According to an aspect of the invention, there is provided a wing assembly for an aircraft. The wing assembly comprises a wing structure for supporting a wing tip device, the wing structure comprising a first span portion having an outer surface profile, for example provided by aerodynamic, or lift generating, surfaces of upper and lower wing covers, of gradually reducing depth in a spanwise outward direction therealong. The wing structure also comprises a second span portion disposed outwardly of the first span portion in the spanwise direction, the second span portion having an outer surface profile, for example provided by aerodynamic, or lift generating, outer surfaces of upper and lower wing covers, of uniform or substantially uniform depth spanwise therealong. The wing assembly further comprises a wing tip device at an outboard end portion of the wing structure, and a joint arrangement. The joint arrangement is configured to support the wing tip device for movement between a flight configuration for use during flight, in which the wing tip device projects from the wing structure for increasing the span of the aircraft, and a ground configuration for use during ground-based manoeuvres, in which the wing tip device is positioned away from the flight configuration for reducing the span of the aircraft. For example, the spanwise uniform outer surface profile depth of the of the second span portion may extend along the entire, or substantially the entire, spanwise extent of the of the second span portion, at least in a wing box region defined between major front and rear spars of the wing.

Such an arrangement, in which the depth at a given location across the width of the second span portion, transversely of the spanwise direction, is maintained in the spanwise direction along the second span portion, facilitates the provision of a deeper wing box at the interface of the wing structure with a wing tip device, and/or facilitates the mitigation or overcoming of potential problems in facilitating support and/or movement of a wing tip device of an aircraft while on the ground while also providing suitable supporting structure for transferring flight loads across the interface joining the wing and wing tip device. For example, greater depth at the joint interface provides fewer constraints on the vertical spacing between upper latches and/or hinge joints and lower latches, facilitating provision of a longer vertical moment arm. A longer vertical moment arm facilitates more effective reacting at the interface of the vertical moment about a chordwise axis generated by lift outboard of the interface joint, reducing in-plane forces at load transfer interfaces between i) joint fittings, such a latch, lug and/or hinge fittings, and ii) the upper and lower covers. In turn, a reduced running load experienced at these load transfer interfaces facilitates the provision of thinner wing covers, together with an increase in vertical separation between the inwardly facing surfaces of the wing covers, facilitating a still further increase in the vertical moment arm, and potential reduction in size, number, strength and/or weight of the required joint fittings.

The greater depth also facilitates the provision of deeper spars at the joint interface, enabling more effective reacting at the interface of vertical shear flow forces. Furthermore, greater depth at the joint interface provides fewer constraints on the vertical spacing between hinge joints on the one hand and an actuator apparatus for moving the wing on the other hand, facilitating favourable positioning of the actuator apparatus in order to obtain mechanical advantage when applying force to the wing tip device, and therefore facilitates the use of smaller and/or lighter actuator apparatus. Still further, the increase in internal capacity of the wing box at the interface of the wing structure with a movable wing tip device reduces design constraints on placement of electrical and/or hydraulic system components within the wing box, for example for actuating rotation of the wing tip device about a hinge and/or for latch locking arrangements. An increased wing box volume in the region of the interface of the wing structure and wing tip device also facilitates the accommodation of increased fuel carrying capacity spanwise outwardly along a wing assembly. This facilitates a reduction in the strength of upward bending moments about a chordwise axis experienced at the root of a wing assembly during flight, potentially allowing some reduction in depth of the wing assembly in a region of the root, with consequential overall mass reduction and/or improvement in the depth to chord ratio in that region.

Preferably, the first span portion has a chord that gradually reduces in the spanwise outward direction, and the second span portion has a substantially uniform chord spanwise therealong. The second span portion may have substantially uniform chord at least partially along its spanwise extent. Preferably, the second span portion has a substantially uniform width, transversely of the spanwise direction, along its spanwise extent. Such arrangements further facilitate the provision of more space inside the wing structure in the region of an interface between the wing structure and a wing tip device, facilitating a further increase in effect of at least some of the advantages described above. This arrangement also facilitates, for example, the provision of an increased number and/or size of hinge joints and/or latch joints to transfer flight loads at locations disposed in chordwise sequence along the interface of the wing structure and the wing tip device. This can facilitate the mitigation of load peaking associated with relatively concentrated and/or isolated groups of lugs, and the accommodation of increased flight loads by the distribution the transfer of such loads across suitably sized hinge joints and latch arrangements disposed at suitably spaced load transfer locations along the interface, in a manner less constrained by internally located components.

A cross sectional profile, taken transverse to the spanwise direction, of inwardly facing surfaces of upper and lower covers of the second span portion conveniently remains substantially uniform spanwise along the second span portion.

A cross sectional profile, taken transverse to the spanwise direction, of outwardly facing surfaces of upper and lower covers of the second span portion conveniently remains substantially uniform spanwise along the second span portion.

Preferably, an outboard end portion of the second span portion comprises the joint arrangement, the joint arrangement comprising a hinge to rotatably support the movable wing tip device for folding between the flight configuration and the ground configuration.

Preferably, the joint arrangement provides an axis of rotation, or hinge axis, extending along a direction parallel with an interface between a spanwise outwardly facing end of the second span portion and a spanwise inwardly facing end of the rotatable wing tip device, for example extending in a chordwise direction, or in a direction generally transverse to the spanwise direction, the axis preferably in a region of an outboard end portion of the second span portion.

An outboard end portion of the second span portion preferably comprises a latch arrangement configured, in a flight condition, to transmit flight loads between structural components of the wing structure and a movable wing tip device, the latch arrangement being proximal to lower and/or upper covers of the wing. This facilitates a longer vertical moment arm, as discussed above.

The second span portion preferably comprises a first spar portion and a second spar portion aft of the first spar portion, the first and second spar portions extending parallel to one another spanwise along the second span portion. The provision of such parallel spar portions facilitates, in some embodiments, convenient mounting and support within the wing structure of a plurality of linear actuators for actuating the wing tip device, mitigating a need for actuator apparatus to extend outwardly of the wing covers. At least one of the actuators may be mounted for example parallel to a respective spar portion.

The wing structure is conveniently a swept wing structure.

Conveniently, the first span portion comprises a first spar and a second spar aft of the first spar, and the second span portion comprises a first spar portion and a second spar portion aft of the first spar portion, the second spar portion of the second span portion comprising a continuation of the second spar of the first span portion along a common linear axis. This facilitates a de-sweeping of the wing structure in the region of the second span portion, whereby the trailing edge second span portion continues along a direction of the trailing edge of the first span portion, and the angle of rearward sweep of the leading edge of the second span portion is reduced. Moving the centre of lift of the wing structure in this manner to a location further forward along the main axis of a fuselage of an aircraft to which the wing structure is fitted facilitates the provision of designs having a main landing gear of the aircraft located further forward and having a reduced offset aft of the aircraft centre of gravity, potentially enabling a reduced reference area of the inner wing and a shorter belly fairing. De-sweeping of the outboard portion of the wing structure can facilitate reduced flight loading of the inner section of the rear spar at high speed by reducing the leading edge down/trailing edge up moment, and/or reduce the outboard component of flow at low speeds, and/or improve stall performance and stability.

Conveniently, the first span portion comprises a first spar and a second spar aft of the first spar, the first and second spars are convergent in a direction towards the second span portion, and the second span portion comprises a first spar portion and a second spar portion aft of the first spar portion, the first spar portion of the second span portion comprising a continuation of the first spar of the first span portion along a common linear axis.

The spanwise extent of the second span portion's lift-generating outer surfaces contributes substantially to the in-flight lift generated by the wing assembly. Preferably, for example, the outer surface extent of the second span portion along the spanwise direction comprises more than 5% of the overall extent of the wing assembly along the spanwise direction when in the flight configuration. More preferably, this extent of the second span portion along the spanwise direction comprises between about 10% and about 25% of the overall outer surface extent of the wing assembly along the spanwise direction when in the flight configuration.

According to a further aspect of the invention, there is provided a tapered swept wing structure extending between a root end portion and a tip end portion thereof, the wing structure including a non-tapered portion, the tip end portion adapted to support a wing tip device for rotation between a flight configuration and a ground configuration. Conveniently, the leading edge of the wing structure is at least partially de-swept at the non-tapered portion, whereby the general angle of sweep of the second span portion from a direction extending perpendicular to a longitudinal axis of the aircraft is generally reduced. The non-tapered portion preferably provides the tip end portion. Preferably, the tip end portion is adapted to movably support the wing tip device. The wing structure preferably tapers continuously chordwise and spanwise from the root end portion to the tip end portion thereof, except along the non-tapered portion.

Preferably, the wing assembly comprises at least one linear actuator to move the wing tip device between the flight configuration and the ground configuration.

The wing assembly preferably comprises a first linear actuation device connected between a first spar portion and the wing tip device, and a second linear actuation device connected between a second spar portion and the wing tip device, the linear actuation devices being operable to drive movement of the wing tip device between the flight configuration and the ground configuration.

Preferably, the first spar portion and the second spar portion extend along respective mutually parallel axes, and respective longitudinal axes of the first and second linear actuation devices extend parallel to the axes of the first and second spar portions. In at least some embodiments, the provision of parallel first and second spar portions facilitates the mounting and support within the wing structure of linear actuators in parallel such that a given extension of each actuator causes a similar displacement at each joint with the wing tip device. This facilitates the provision of a simpler control system for the actuators and mitigates the need for arrangements to reduce force fighting between the actuators during actuation of the wing tip device, and/or mitigates the need for components to be mounted externally of the wing structure, reducing the efficiency of flow across the aerodynamic surfaces of the wing. The actuator devices are conveniently mounted to the spars outside of the wing box, respectively forward of the first spar and aft of the second spar, further reducing space constraints within the wing box.

Preferably, the wing assembly is a high aspect ratio long span wing assembly for a large passenger or freight aircraft.

According to another aspect of the invention, there is provided an aircraft comprising a wing assembly or a wing structure in accordance with an aspect of the invention.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft may be a commercial aircraft, for example a commercial passenger aircraft, for example a single aisle or twin aisle aircraft.

It will be apparent from the above that at least some aspects of the invention facilitate the provision of longer movable wing tip devices and/or longer span wing assemblies. Especially when used with high aspect ratio wings with low thickness to chord ratios and shallow wing boxes, this can result in wing assemblies with reduced overall drag, and aircraft with increased fuel efficiency, reduced emissions and/or reduced operating costs. Whilst in some embodiments a substantially uniform depth span portion may somewhat increase drag locally compared to a conventional continuously tapering wing, an overall increase in wing efficiency is facilitated compared, for example, to increasing the depth of a tapering wing from root to tip to provide a deeper wing box at the interface with the wing tip device, and/or where the deeper wing box removes a need for externally protruding mechanisms such as latch, locking and/or drive mechanisms.

The wing tip device may be a wing tip extension, for example a generally planar tip extension. In other embodiments, the wing tip device may comprise, or consist of, a non-planar device, such as a winglet. The wing tip device may comprise a further wing section having a further movable wing tip device at its distal end. The ordinarily skilled person will be aware of other devices suitable for movably placing at the wing tip. The wing tip device may include, for example, trailing edge moveable devices for control (ailerons) or leading edge devices for stall protection, such as slats or droop nose devices.

In the flight configuration the trailing edge of the wing tip device may be a continuation of the trailing edge of the wing or wing structure. The leading edge of the wing tip device may be a continuation of the leading edge of the wing or wing structure, such that there is a smooth transition from the wing or wing structure to the wing tip device. It will be appreciated that there may be a smooth transition, even where there are changes in sweep or twist at the wing/wing tip device junction. However, there are preferably no discontinuities at the junction between the wing or wing structure and wing tip device. The junction between the wing or wing structure and wing tip device may extend along a chordwise direction of the wing structure, which is generally aerodynamically favourable, or at another angle relative to the wing structure for example perpendicular to a spanwise direction of the wing structure, which may in some embodiments facilitate efficient arrangement of mechanisms for moving the wing tip device.

At least at the root of the wing tip device, and preferably along the length of the wing tip device, the upper and lower surfaces of the wing tip device may be continuations of the upper and lower surfaces of the wing. The span ratio of the wing structure relative to the wing tip device may be such that the wing structure comprises at least 60%, 70%, 80%, 90% or more of the overall span of the wing assembly. The span ratio of the first, or tapered, span portion of the wing structure relative to the second span portion and to the wing tip device may be such that the first span portion comprises at least 40% 50%, 60%, 70% or more of the overall span of a wing assembly when in the flight configuration. The span ratio of the second, or non-tapered, span portion of the wing structure relative to the first portion of the wing structure may be such that the second span portion comprises at least 5%, 10%, 20% or more of the wing structure. The wing structure may comprise a wing root fixedly mounted to an aircraft body. In alternative embodiments, the wing structure may be movably connected to an inboard further wing portion, the latter fixedly mounted to the aircraft body, providing a wing assembly with more than two relatively movable sections.

When the wing tip device is in the ground configuration, the aircraft incorporating the wing assembly, may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration. In the ground configuration the wing tip device may be held in place. For example the wing tip device may be latched or locked in place to prevent movement back towards the flight configuration.

It will of course be appreciated that features described in relation to one aspect of the present invention may be incorporated into other aspects of the present invention.

DESCRIPTION OF THE DRAWINGS

Embodiments of the present invention will now be described by way of example only with reference to the accompanying schematic drawings of which.

DETAILED DESCRIPTION

Figure 1:
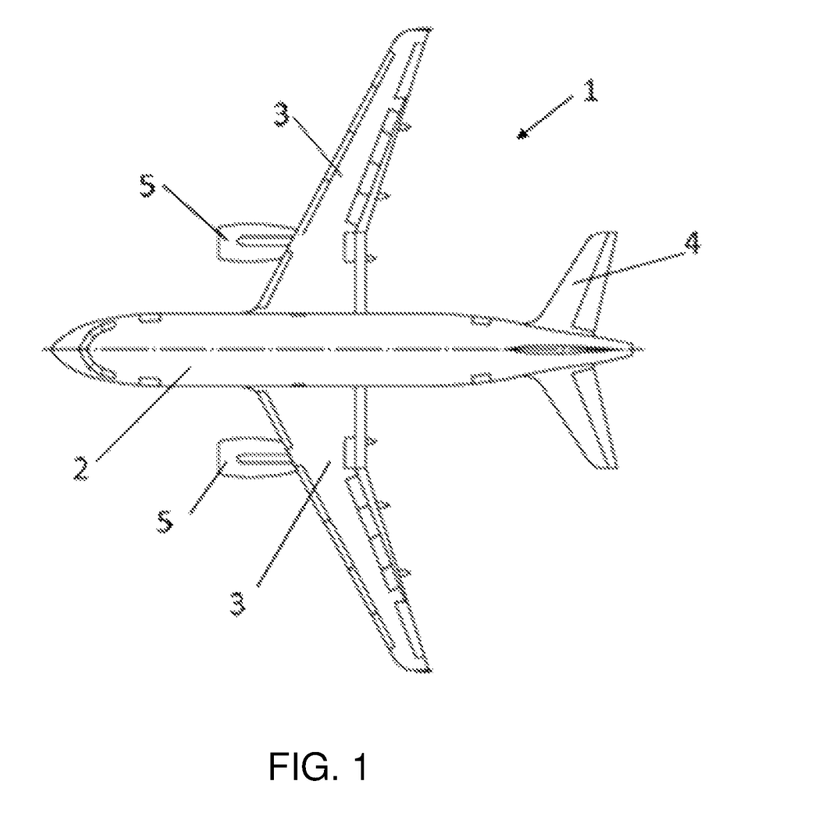
FIG. 1 is a top view of a passenger aircraft to which embodiments of the invention may be applied.

FIG. 1 shows a passenger aircraft 1 having a fuselage 2, wings 3, a tailplane 4 and engines 5. The aircraft shown in FIG. 1 is a simply one example of an aircraft to which embodiments of the invention may be directed. The wing tips may be retro-fitted or fitted during manufacture of the aircraft.

Figure 2:
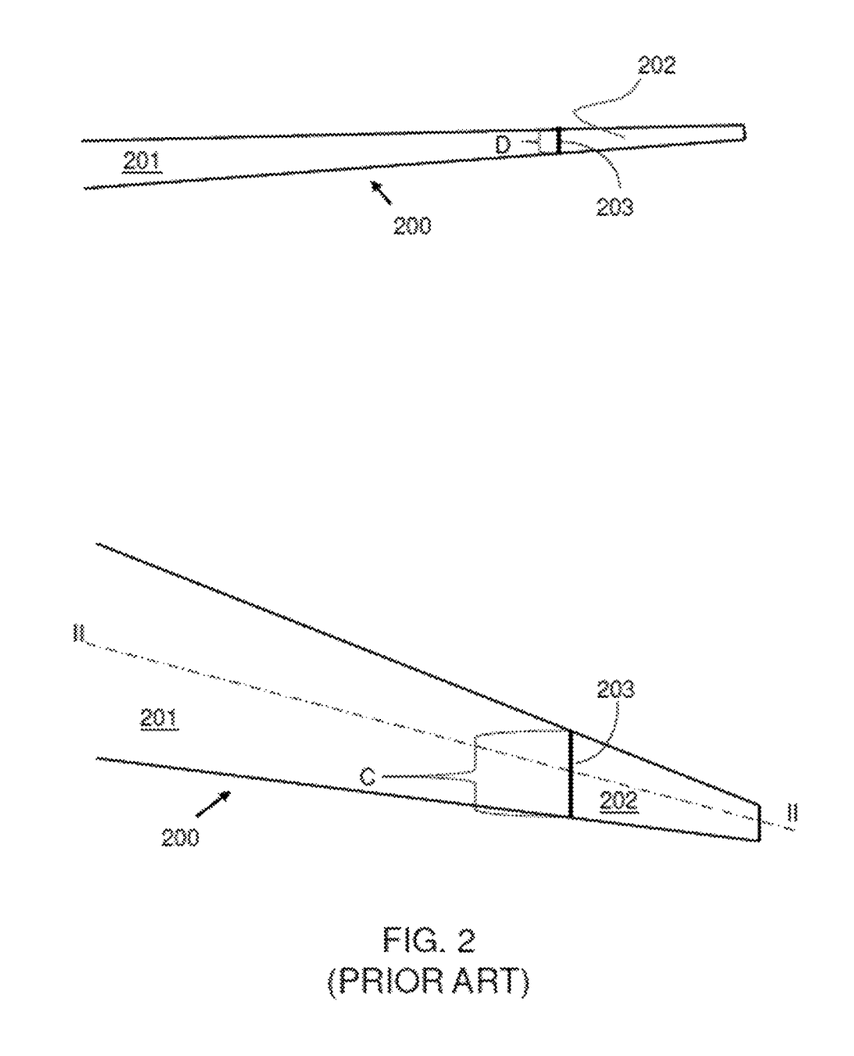
FIG. 2 shows portions of a known wing assembly in a flight configuration, in top plan view (at bottom) and in sectional view from the rear (at top)

FIG. 2 shows portions of a known wing assembly 200 in a flight configuration. The wing assembly may, for example be a right hand one (as viewed looking forwards along the fuselage 2) of the wing assemblies 3 shown in FIG. 1. The lower portion of FIG. 2 is a top plan view of the wing assembly 200. The upper portion of FIG. 2 is a view from the rear of the wing assembly onto a vertical section II shown in the top plan view below. The known wing assembly 200 has a wing structure 201, and a wing tip device 202 for mounting to an end portion of the wing structure 201 at an interface region 203 of the wing structure 201 and the wing tip device 202. The wing structure 201 is fixed at a root end thereof to a fuselage (not shown) of an aircraft. In alternative embodiments (not shown), the wing structure 201 may be movably mounted to a further wing portion inboard of the wing structure 201. The known wing assembly 200 is swept and also tapers inwardly chordwise and depthwise continuously from root end to tip end. The rate of taper may vary along different spanwise extending portions of the wing assembly 200. As the wing assembly 200 tapers chordwise, the thickness-to-chord ratio is maintained close to constant in the outboard span portion of the wing assembly 200 on both sides of the interface region 203, for example to provide desirable aerodynamic effects such as reduced induced drag at lower speeds. The depth D of the wing assembly 200 and the chord C of the wing assembly 200 at the interface region 203 are dependent on the rate of taper and the desired thickness-to-chord ratio.

Figure 3:
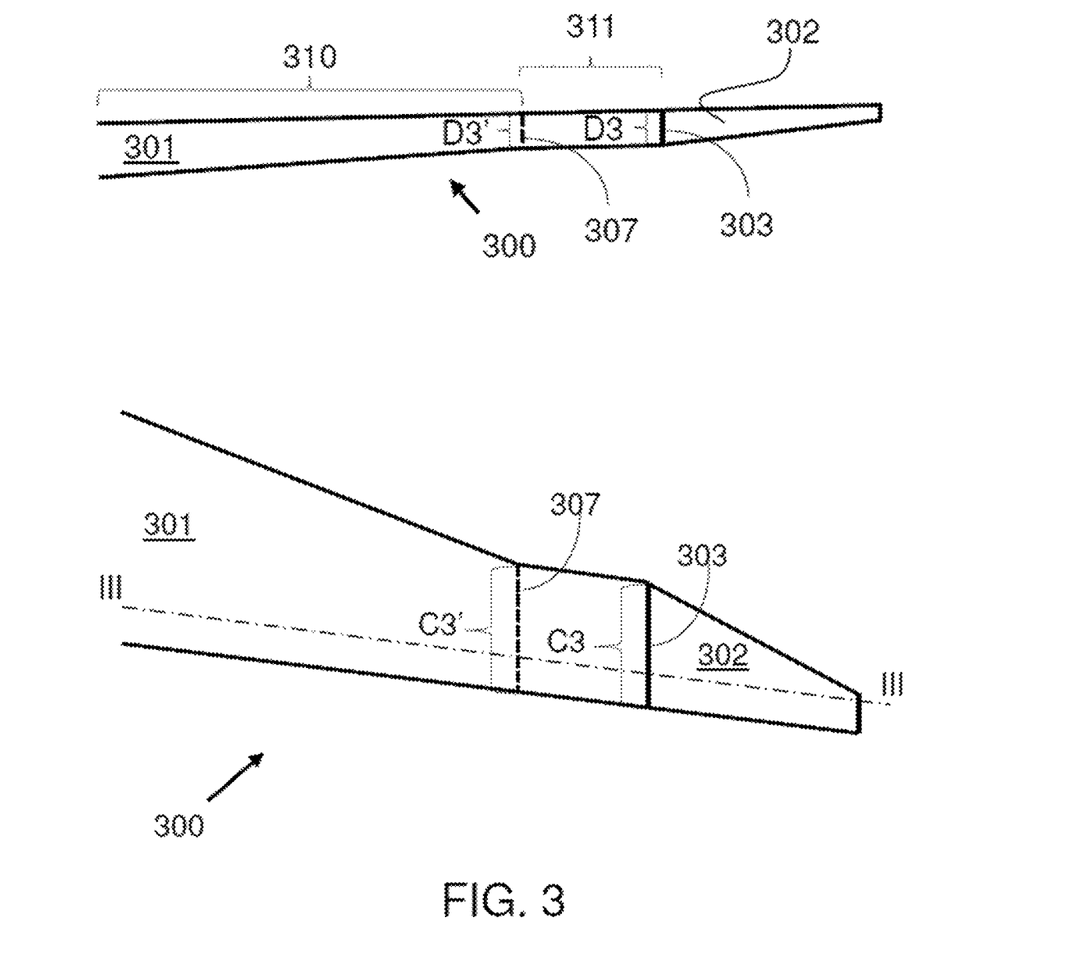
FIG. 3 shows portions of a wing assembly in accordance with an embodiment of the invention in a flight configuration, in top plan view (at bottom) and in sectional view from the rear along III-III (at top)

Referring now to FIG. 3, a wing assembly 300 for an aircraft is shown in accordance with embodiments of the invention. The wing assembly 300 comprises a wing structure 301 and a wing tip device 302 supported at an outboard end of the wing structure 301, which forms part of an interface region 303 of the wing structure 301 and the wing tip device 302. In at least some embodiments the wing tip device 302 is moveable between a flight configuration for use during flight, as shown in FIG. 3, in which the wing tip device 302 projects from the wing structure 301 for increasing the span of the aircraft, and a ground configuration (not shown) for use during ground-based manoeuvres in which the wing tip device 302 is positioned away from the flight configuration for reducing the span of the aircraft.

The wing structure 301 comprises a first span portion 310 having a depth that gradually reduces in a spanwise outward direction, and a second span portion 311 disposed outwardly of the first span portion 310 in the spanwise direction, the second span portion 311 having a substantially uniform depth D3, D3' spanwise therealong. As shown in FIG. 3, the depth D3 of the outboard end of the wing structure 301 at the interface region 303 is substantially the same as depth D3' at the transition 307 (shown by broken line) of the wing structure 301 between the first span portion 310 and the second span portion 311 thereof.

In the embodiment shown in FIG. 3, the first span portion 310 has both a chord and depth that gradually reduce in the spanwise outward direction, and the second span portion 311 has a substantially uniform chord C3, C3' and depth D3, D3' spanwise therealong. The chord C3 of the outboard end of the wing structure 301 at the interface region 303 is therefore substantially the same as the chord C3' at the transition 307 between the first span portion 310 and the second span portion 311. In preferred embodiments, the depth varies chordwise across the second span portion 311 of the wing structure 301 in order to provide an aerodynamically efficient airflow over the wing assembly 300 in flight, while at a selected position along the chord the depth will extend uniformly spanwise along the second span portion 311.

It will be apparent that wing structure 301 is a swept wing structure extending between a root end portion and a tip end portion thereof forming part of the interface region 303. The wing structure 301 tapers continuously chordwise and spanwise from the root end portion to the tip end portion thereof, except along a non-tapered portion thereof. The tapered portion comprises the first span portion 310, and the non-tapered portion comprises the second span portion 311.

The non-tapered portion 311 provides the tip, or outboard, end portion of the wing structure 301, which end portion is adapted to support the wing tip device 302, as described in more detail below with reference to FIG. 5. The leading edge of the wing structure 301 is partially de-swept at the non-tapered portion 311.

Figure 4:
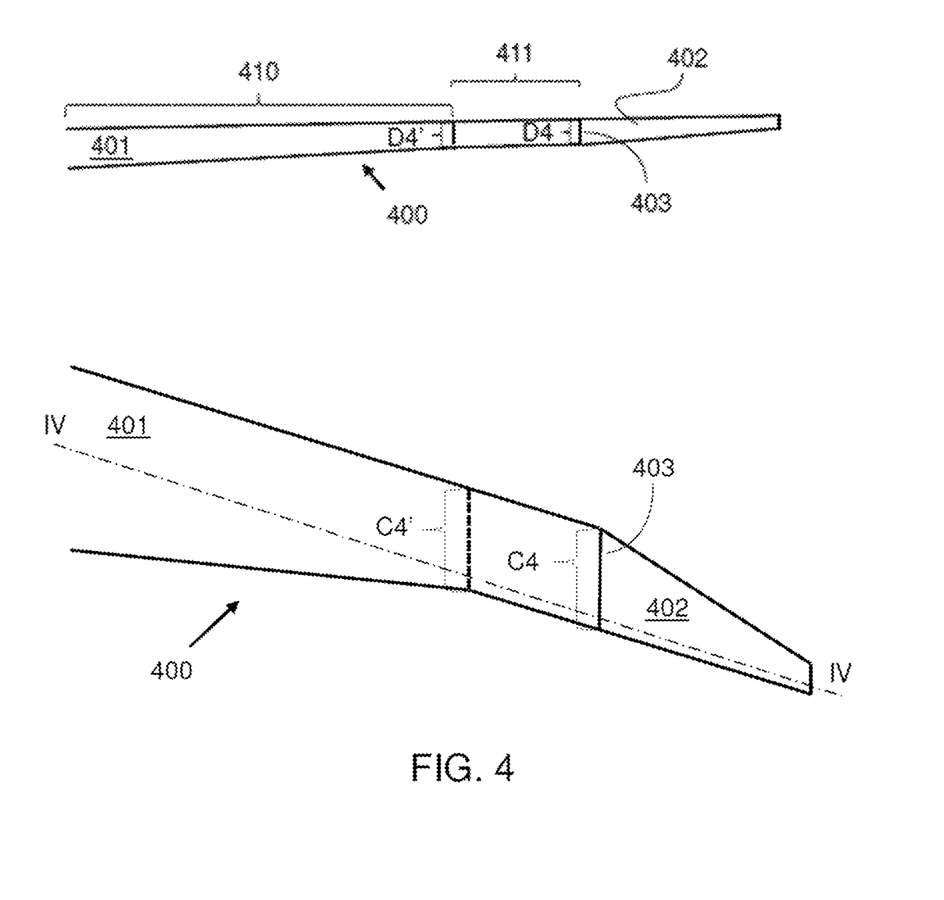
FIG. 4 shows portions of a wing assembly in accordance with a further embodiment of the invention in a flight configuration, in top plan view (at bottom) and in sectional view from the rear along Iv-Iv (at top)

Referring now to FIG. 4, a wing assembly 400 for an aircraft is shown in accordance with further embodiments of the invention. The wing assembly 400 comprises a wing structure 401 and a wing tip device 402 supported at an outboard end of the wing structure 401, which forms part of an interface region 403 of the wing structure 401 and the wing tip device 402. In at least some embodiments the wing tip device 402 is moveable between a flight configuration for use during flight, as shown in FIG. 4, in which the wing tip device 402 projects from the wing structure 401 for increasing the span of the aircraft, and a ground configuration (not shown) for use during ground-based manoeuvres in which the wing tip device 402 is positioned away from the flight configuration for reducing the span of the aircraft.

The wing structure 401 comprises a first span portion 410 having a depth that gradually reduces in a spanwise outward direction, and a second span portion 411 disposed outwardly of the first span portion 410 in the spanwise direction, the second span portion 411 having a substantially uniform depth D4, D4' spanwise therealong. As shown in FIG. 4, the depth D4 of the outboard end of the wing structure 401 at the interface region 403 is substantially the same as depth D4' at the transition 407 (shown by broken line) of the wing structure 401 between the first span portion 410 and the second span portion 411 thereof.

In the embodiment shown in FIG. 4, the first span portion 410 has both a chord and depth that gradually reduce in the spanwise outward direction, and the second span portion 411 has a substantially uniform chord C4, C4' and depth D4, D4' spanwise therealong. The chord C4 of the outboard end of the wing structure 401 at the interface region 403 is therefore substantially the same as the chord C4' at the transition 407 between the first span portion 410 and the second span portion 411. In preferred embodiments, the depth varies chordwise across the second span portion 411 of the wing structure 401 in order to provide an aerodynamically efficient airflow over the wing assembly 400 in flight, while at a selected position along the chord the depth will extend uniformly spanwise along the second span portion 411.

It will be apparent that wing structure 401 is a swept wing structure extending between a root end portion and a tip end portion thereof forming part of the interface region 403. The wing structure 401 tapers continuously chordwise and spanwise from the root end portion to the tip end portion thereof, except along a non-tapered portion thereof. The tapered portion comprises the first span portion 410, and the non-tapered portion comprises the second span portion 411. The non-tapered portion 411 provides the tip, or outboard, end portion of the wing structure 401, which end portion is adapted to support the wing tip device 402, as described in more detail below with reference to FIG. 5.

Figure 5:
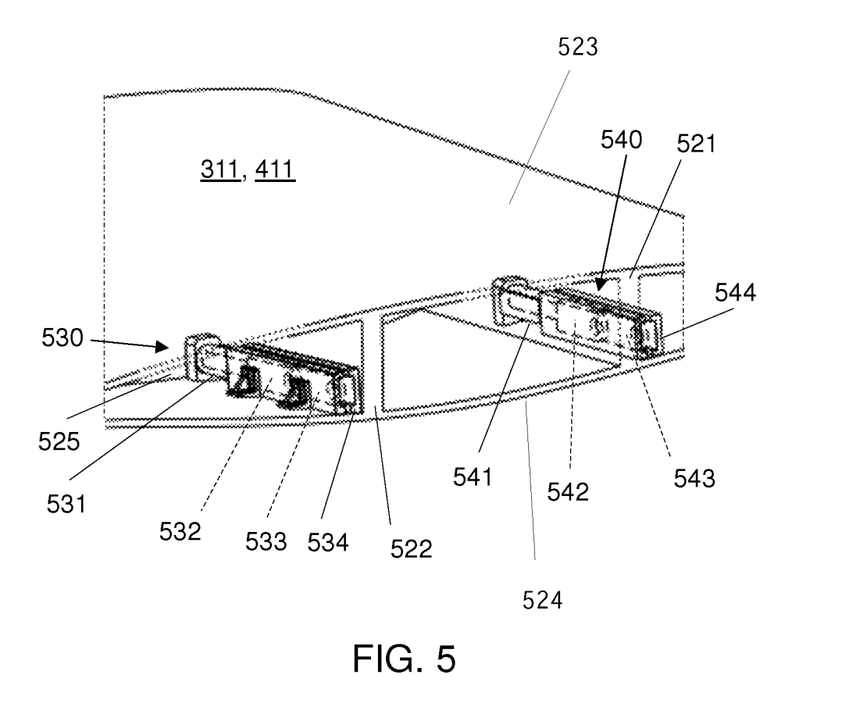
FIG. 5 is a rear perspective view from an outboard end of a wing structure arrangement for the wing assembly of FIG. 3 or FIG. 4, showing parts of the wing structure.

FIG. 5 is a rear perspective view from an outboard end showing parts of a non-tapered portion of a wing structure arrangement that is generally suitable with slight adaptations for use as the non-tapered portion 311, 411 of both of the wing structures 301, 401 described herein with reference to FIGS. 3 and 4 respectively. Along the tapering first span portion 310, 410 each wing structure 301, 401 comprises a first spar (not shown) and a second spar (not shown) aft of the first spar, the first and second spars convergent in a direction towards the non-tapered second span portion 311, 411. The second span portion 311, 411 comprises a first spar portion 521 and a second spar portion 522 aft of the first spar portion 521, the first and second spar portions 521, 522 extending parallel to one another along respective mutually parallel axes spanwise along the second span portion 311, 411.

In the wing structure 301 described herein with reference to FIG. 3, the second spar portion 522 of the second span portion 311 comprises a continuation of the second spar of the first span portion 310 along a common linear axis.

In the wing structure 401 described herein with reference to FIG. 4, the first spar portion 521 of the second span portion 411 comprises a continuation of the first spar of the first span portion 411 along a common linear axis.

The first and second spar portions 521, 522 are connected to upper and lower covers 523, 524 by suitable fixings (not shown), together with at least one chordwise extending rib 525, for transferring and distributing loads across the supporting structures of the wing assembly 300, 400. The wing assembly 300, 400 also includes a D nose portion forward of the first spar 521 and a trailing portion aft of the second spar 522, which continue the surfaces of the covers 523, 524 and optionally are integrally formed with the covers 523, 524. A cross sectional profile, taken transverse to the spanwise direction, of inwardly and outwardly facing surfaces of the upper 523 and lower 524 covers of the second span portion 311, 411 remains substantially uniform spanwise along the second span portion 311, 411, with due allowance being made for any minor deviations necessary to accommodate fixings and other essential components.

The non-tapered portion 311, 411 provides the tip, or outboard, end portion of the wing structure 301, 401, which end portion is adapted to support the wing tip device 302, 402. For example, in some embodiments the outboard end portion is provided with a latch arrangement (not shown) configured to transmit flight loads, in a flight condition, between structural components such as the spars, covers and ribs of the wing structure 301, 401 and the movable wing tip device 402. The latch arrangement for example includes interengagable latch lugs fitted respectively to upper and/or lower covers of the wing structure 301, 401 and wing tip device 302, 402 respectively, latches for latching the lugs together, and optionally a latch locking mechanism. The latch arrangement is disposed in close proximity to the lower and/or upper covers of the wing.

The tip end portion in at least some embodiments is adapted to movably support the wing tip device 402, for example by the provision of a joint arrangement which may comprise a hinge (not shown) and an actuation device for rotating the wing tip device 402 about a chordwise extending axis of the hinge into the ground configuration. In the embodiment shown in FIG. 5, a first linear actuation device 540 is connected between the first spar portion 521 and the wing tip device 302, 402, and a second linear actuation device 530 is connected between the second spar portion 522 and the wing tip device 302, 402, the linear actuation devices 530, 540 being operable to drive movement of the wing tip device 302, 402 between the flight configuration and the ground configuration.

Each linear actuation device 530, 540 includes, for example, a cylinder or base portion 531, 541, a piston or driven portion 532, 542 movable relative to the base portion, a connection portion 533, 543 pivotably connected at one end to the driven portion 532, 542 and at an opposite end to a pivot mount of the wing tip device 302, 402, and a guide 534, 544 for guiding and supporting movement of the pivotable connection portion 533, 543 during actuation.

In at least some embodiments, respective longitudinal axes of the first and second linear actuation devices 540, 530 extend parallel to one another, and substantially perpendicular with the hinge axis. This facilitates the provision of a simpler and more cost effective and/or reliable actuation arrangement. For example, control systems and mechanisms do not need to accommodate the necessary differences in travel and speed perpendicular to the hinge axis between driven portions 532, 542 of the actuation devices 540, 530, or the non-alignment of axial forces from the actuation devices 540, 530.

In preferred embodiments, longitudinal axes of the first and second linear actuation devices 540, 530 extend parallel to the axes of the first and second parallel spar portions 521, 522. The provision of the non-tapered portion 311, 411 having substantially uniform chord and depth, facilitates the provision of parallel spar portions supporting mutually parallel actuator devices 540, 530, and the use and support of linear actuators.

The actuator devices 540, 530 are conveniently mounted to the spars outside of the wing box, respectively forward of the first spar 521 and aft of the second spar 522, further reducing space constraints within the wing box. Mounting the actuation devices 540, 530 within the leading and trailing edge regions of the wing structure 311, 411, outside of the wing box, facilitates the provision of relatively easy access to the actuator devices 540, 530. Still further, an increase in free space within the wing structure 311, 411 facilitates efficient placement within the wing structure 311, 411 of hydraulic and/or electrical and/or other system components required to pass from the wing into the wing tip device, and/or of fuel tanks of appropriate size and shape within the wing box.

The actuation devices 530, 540 are disposed as close as the operational envelope of the devices allows to an inner surface of the lower covers 524 which forms a bottom inner surface of the wing. This facilitates the provision of an increased vertical moment arm, further facilitated by the greater depth D3, D4, between a spanwise extending axis along which axial force is provided by the actuation devices 530, 540 and the hinge axis about which the wing tip device 302, 402 is driven by the actuation devices 530, 540.

The provision of more space within the wing structure 311, 411 at the interface 303, 403 with the wing tip device 302, together with increased chord, or increased width transverse to the spanwise direction, at the interface 303, facilitates the provision of more efficient joints at the interface 303. For example, a sequence of hinges interspersed with upper latches can be provided, and/or a sequence of lower latches, which in some embodiments can extend substantially uninterrupted between the front spar portion 521 and the rear spar portion 522.

At least some embodiments of the wing assembly 300, 400 are particularly advantageous when applied to a high aspect ratio long span wing assembly for a large passenger or freight aircraft. In at least some embodiments, the region of the wing assembly 300, 400 comprising the non-tapered portion 311, 312 and the wing tip device 302, 402 extends wholly within a region extending spanwise along the outermost 40% of the span of the distal end of the wing.

Whilst the present invention has been described and illustrated with reference to particular embodiments, it will be appreciated by those of ordinary skill in the art that the invention lends itself to many different variations not specifically illustrated herein. By way of example only, certain possible variations will now be described. In some alternative embodiments, the wing tip device may not be movable in operational use of the aircraft, but is immovably joined to the wing structure. Although in the embodiments of FIGS. 3 and 4 the interface region 303, 403 extends along a chord of the wing assembly 300, 400 in alignment with in flight airflow over the wing assembly 300, 400, in alternative embodiments the interface 303, 403 at the end portion of the wing structure 301, 401 is aligned perpendicular to the leading edge and/or trailing edge of the second span portion 311, 411 of the wing structure 301, 401, or at another angle thereto, that is, the line of cut between the wing structure 301, 401 and the wing tip device 302, 402 is not aligned along a chord.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A wing assembly for an aircraft, the wing assembly comprising:
   i. a wing structure for supporting a wing tip device, the wing structure comprising a first span portion having an outer surface profile of gradually reducing depth in a spanwise outward direction therealong, and a second span portion disposed outwardly of the first span portion in the spanwise direction;
   ii. a wing tip device at an outboard end portion of the wing structure; and wherein the second span portion is mounted to the first span portion at a first interface region and to the wing tip device at a second interface region, and wherein the second span portion has an outer surface profile of substantially uniform depth spanwise between the first and the second interface regions;
   iii. a joint arrangement operably disposed within the second interface region and configured to support the wing tip device for movement between a flight configuration for use during flight, in which the wing tip device projects from the wing structure for increasing the span of the aircraft, and a ground configuration for use during ground-based manoeuvres, in which the wing tip device is positioned away from the flight configuration for reducing the span of the aircraft.

2. A wing assembly according to claim 1, the first span portion having a chord that gradually reduces in the spanwise outward direction, and the second span portion having a substantially uniform chord spanwise therealong.

3. A wing assembly according to claim 1, wherein a cross sectional profile, taken transverse to the spanwise direction, of inwardly facing surfaces of upper and lower covers of the second span portion remains substantially uniform spanwise along the second span portion.

4. A wing assembly according to claim 1, wherein a cross sectional profile, taken transverse to the spanwise direction, of outwardly facing surfaces of upper and lower covers of the second span portion remains substantially uniform spanwise along the second span portion.

5. A wing assembly according to claim 1, wherein the joint arrangement comprises a hinge to rotatably support the movable wing tip device for folding between the flight configuration and the ground configuration.

6. A wing assembly according to claim 1, wherein an outboard end portion of the second span portion comprises a latch arrangement configured, in a flight condition, to transmit flight loads between structural components of the wing structure and the movable wing tip device.

7. A wing assembly according to claim 1, wherein the second span portion comprises a first spar portion and a second spar portion aft of the first spar portion, the first and second spar portions extending parallel to one another spanwise along the second span portion.

8. A wing assembly according to claim 1, wherein the first span portion comprises a first spar and a second spar aft of the first spar, the first and second spars convergent in a direction towards the second span portion, and the second span portion comprises a first spar portion and a second spar portion aft of the first spar portion, the second spar portion of the second span portion comprising a continuation of the second spar of the first span portion along a common linear axis.

9. A wing assembly according to claim 1, wherein the first span portion comprises a first spar and a second spar aft of the first spar, and the second span portion comprises a first spar portion and a second spar portion aft of the first spar portion, the first spar portion of the second span portion comprising a continuation of the first spar of the first span portion along a common linear axis.

10. A wing assembly according to claim 1, wherein the wing structure is a tapered swept wing structure.

11. A wing assembly according to claim 10, the leading edge of the wing structure being at least partially de-swept a non-tapered portion of the wing structure.

12. A wing assembly according to claim 11, wherein the non-tapered portion provides the tip end portion.

13. A wing assembly according to claim 11, the wing structure tapering continuously chordwise and spanwise from the root end portion to the tip end portion thereof, except along the non-tapered portion.

14. An aircraft comprising a wing assembly according to claim 10.

15. A wing assembly according to claim 1, comprising a first linear actuation device connected between a first spar portion and the wing tip device, and a second linear actuation device connected between a second spar portion and the wing tip device, the linear actuation devices being operable to drive movement of the wing tip device between the flight configuration and the ground configuration.

16. A wing assembly according to claim 15, wherein the first spar portion and the second spar portion extend along respective mutually parallel axes, and respective longitudinal axes of the first and second linear actuation devices extend parallel to the axes of the first and second spar portions.

17. A wing assembly according to claim 1, wherein the wing assembly is a wing assembly for a large passenger or freight aircraft.

18. An aircraft comprising a wing assembly according to claim 1.

* * * * *